United States Patent

Crosby et al.

[11] Patent Number: 5,282,695
[45] Date of Patent: * Feb. 1, 1994

[54] APPARATUS AND METHOD FOR THERMALLY STRIPPING VOLATILE ORGANIC COMPOUNDS FROM SOIL USING A RECIRCULATING COMBUSTIBLE GAS

[75] Inventors: Richard A. Crosby, 7257-203 Point Lake Dr., Charlotte, N.C. 28212; Junior L. Crosby, 7819-105 Calibre Crossing, Charlotte, N.C. 28227

[73] Assignees: Richard A. Crosby; Junior L. Crosby, Charlotte, N.C.

[*] Notice: The portion of the term of this patent subsequent to Oct. 1, 2008 has been disclaimed.

[21] Appl. No.: 966,685

[22] Filed: Oct. 26, 1992

Related U.S. Application Data

[60] Division of Ser. No. 728,094, Jul. 10, 1991, Pat. No. 5,228,803, which is a continuation-in-part of Ser. No. 537,089, Jun. 12, 1990, Pat. No. 5,052,858.

[51] Int. Cl.⁵ .................... F23G 7/14; F23G 5/04; F23G 5/12; F23G 5/20
[52] U.S. Cl. .................... 405/128; 110/346; 405/258; 432/105; 432/118
[58] Field of Search .......... 405/128, 129, 258; 241/DIG. 10; 110/235, 236, 240, 241, 346; 210/771; 34/136, 137; 432/105, 108, 110, 111, 118; 209/284, 297

[56] References Cited

U.S. PATENT DOCUMENTS

| | | | |
|---|---|---|---|
| 3,745,700 | 7/1973 | Hahn | 47/1.42 |
| 3,861,335 | 1/1975 | Przewalski | 110/14 |
| 4,648,332 | 3/1987 | Goedhart | 110/346 |
| 4,648,333 | 3/1987 | Mudd et al. | 110/346 |
| 4,667,609 | 5/1987 | Hardison et al. | 110/236 |
| 4,700,638 | 10/1987 | Przewalski | 110/346 |
| 4,715,965 | 12/1987 | Sigerson et al. | 210/800 |
| 4,730,564 | 3/1988 | Abboud | 110/246 |
| 4,748,921 | 6/1988 | Mendenhall | 110/346 |
| 4,815,398 | 3/1989 | Keating et al. | 110/233 |
| 4,864,942 | 9/1989 | Fochtman et al. | 110/226 |
| 4,881,475 | 11/1989 | De Leur | 110/346 |
| 4,951,417 | 8/1990 | Gerken et al. | 47/1.42 |
| 4,957,429 | 9/1990 | Mendenhall | 432/14 |
| 5,027,721 | 7/1991 | Anderson | 110/236 |
| 5,052,858 | 10/1991 | Crosby et al. | 405/128 |
| 5,072,674 | 12/1991 | Noland | 110/346 |
| 5,086,717 | 2/1992 | McCrossan | 110/346 |

OTHER PUBLICATIONS

R. Perry and D. Green, Perry's Chemical Engineers' Handbook, at 20-29 to 20-35 (6th ed. 1984).

Primary Examiner—Randolph A. Reese
Assistant Examiner—John Ricci
Attorney, Agent, or Firm—Woodcock Washburn Kurtz Mackiewicz & Norris

[57] ABSTRACT

A transportable thermal stripping system for removing volatile organic compounds (VOC) from soil is provided. The system includes a vessel in which contaminated soil is placed into contact with a hot gas. The gas is discharged from the vessel and ambient air is introduced into the gas to ensure that the gas remains combustible. A blower circulates the gas to a cyclone separator where fine soil particles and ash are removed from the gas. Next the VOC in the gas are removed by combustion in a burner fired with a supplemental fuel. A portion of the combusted gas is exhausted to atmosphere and the remainder is recirculated to the vessel where the process is repeated.

15 Claims, 5 Drawing Sheets

APPARATUS AND METHOD FOR THERMALLY STRIPPING VOLATILE ORGANIC COMPOUNDS FROM SOIL USING A RECIRCULATING COMBUSTIBLE GAS

REFERENCE TO RELATED APPLICATION

This application is a divisional of co-pending application U.S. Ser. No. 728,094, filed Jul. 10, 1991, now U.S. Pat. No. 5,228,803, issued Jul. 20, 1993, which in turn is a continuation-in-part of copending application U.S. Ser. No. 537,089, filed Jun. 12, 1990, now U.S. Pat. No. 5,052,858, issued Oct. 1, 1991, the disclosures of which are hereby incorporated by reference in their entirety.

FIELD OF INVENTION

The present invention is directed to an apparatus and method for removing volatile organic compounds ("VOC"), such as petroleum hydrocarbons, from soil using a hot gas for stripping the VOC from the soil.

More specifically, the current invention is directed to such an apparatus and method in which the stripping gas is combusted after it has volatilized the VOC, whereupon a first portion of the hot stripping gas is recirculated to minimize energy consumption and a second portion of the hot stripping gas is exhausted to atmosphere after cleanup.

BACKGROUND OF THE INVENTION

The present invention is directed to an apparatus and method for removing volatile organic compounds, such as petroleum hydrocarbons, from soil, as a means for the environmental clean up of a dump site, landfill or spill site.

Environmental laws have imposed requirements that remedial measures be taken in dump sites, landfills and following chemical spills, leakages or other accidents. This is particularly important in order to prevent chemicals from contaminating ground water due to percolation through the soil. When the chemical contaminant is a volatile organic compound, the remedial measures may involve removing such compounds from the soil by volatilization. Such volatilization can readily be accomplished by heating the soil in a furnace. However, this method requires that the soil be transported to a suitable processing facility for treatment. For all but very small clean ups, this method is prohibitively expensive in view of the high transportation costs required.

Consequently, it would be desirable to develop an apparatus and method for removing volatile organic compounds from contaminated soil while on-site, using as a means for such removal, equipment that is easily transported to that site. Since, with portable equipment, the volume of soil which can be processed at any one time will necessarily be limited, it would be desirable to provide a means for accelerating the volatilization rate so that the total clean up time is minimized.

Applicant's patent application U.S. Ser. No. 537,089 disclosed an apparatus and method for removing volatile organic compounds from contaminated soil while on-site, using equipment that is easily transported to the site. According to that scheme, all of the hot gas used to strip the VOC from the soil was exhausted directly to atmosphere without cleanup. Although this approach affords an excellent response to environmental needs in many situations, it suffers from two drawbacks. First, the gas exhausted to atmosphere contains substantial heat which was added to the gas by burning a relatively expensive fuel—specifically, propane. Hence, the thermal efficiency and economy of the thermal stripping process is impaired. Second, since the stripping gas is laden with VOC, which are a source of air pollution, the amount of soil which can be treated per day is often limited by local environmental regulations.

Consequently, it would be desirable to provide a portable thermal stripping apparatus which minimizes the amount of supplemental fuel which must be burned to heat the stripping gas and which removes at least a portion of the VOC in the gas prior to exhausting it to atmosphere.

SUMMARY OF THE INVENTION

It is an object of the current invention to provide a portable apparatus and a method for removing VOC from soil utilizing a hot stripping gas in which the amount of supplemental fuel which must be burned to adequately heat the stripping gas is minimized and at least a portion of the VOC in the gas are removed prior to exhausting the gas to atmosphere.

These objects are accomplished in a method for removing VOC from soil by (i) loading the soil into a vessel, (ii) introducing a hot gas into the vessel and causing the hot gas to come into contact with the soil, thereby partially cooling the hot gas and volatilizing the volatile organic compounds into the gas, (iii) discharging the gas from the vessel, (iv) introducing air into the discharged gas, thereby forming a combustible gas, (v) burning the combustible gas, thereby oxidizing at least a portion of the volatile organic compounds volatilized into the gas and reheating the gas, (vi) discharging a first portion of the reheated gas to atmosphere, (vii) recirculating a second portion of the reheated gas to the vessel and causing the second portion of the gas to come into contact with the soil, thereby partially cooling the hot gas and volatilizing the volatile organic compounds into the gas, and (viii) repeating steps (iii)-(vi).

DESCRIPTION OF THE PREFERRED EMBODIMENT

Figure 1:
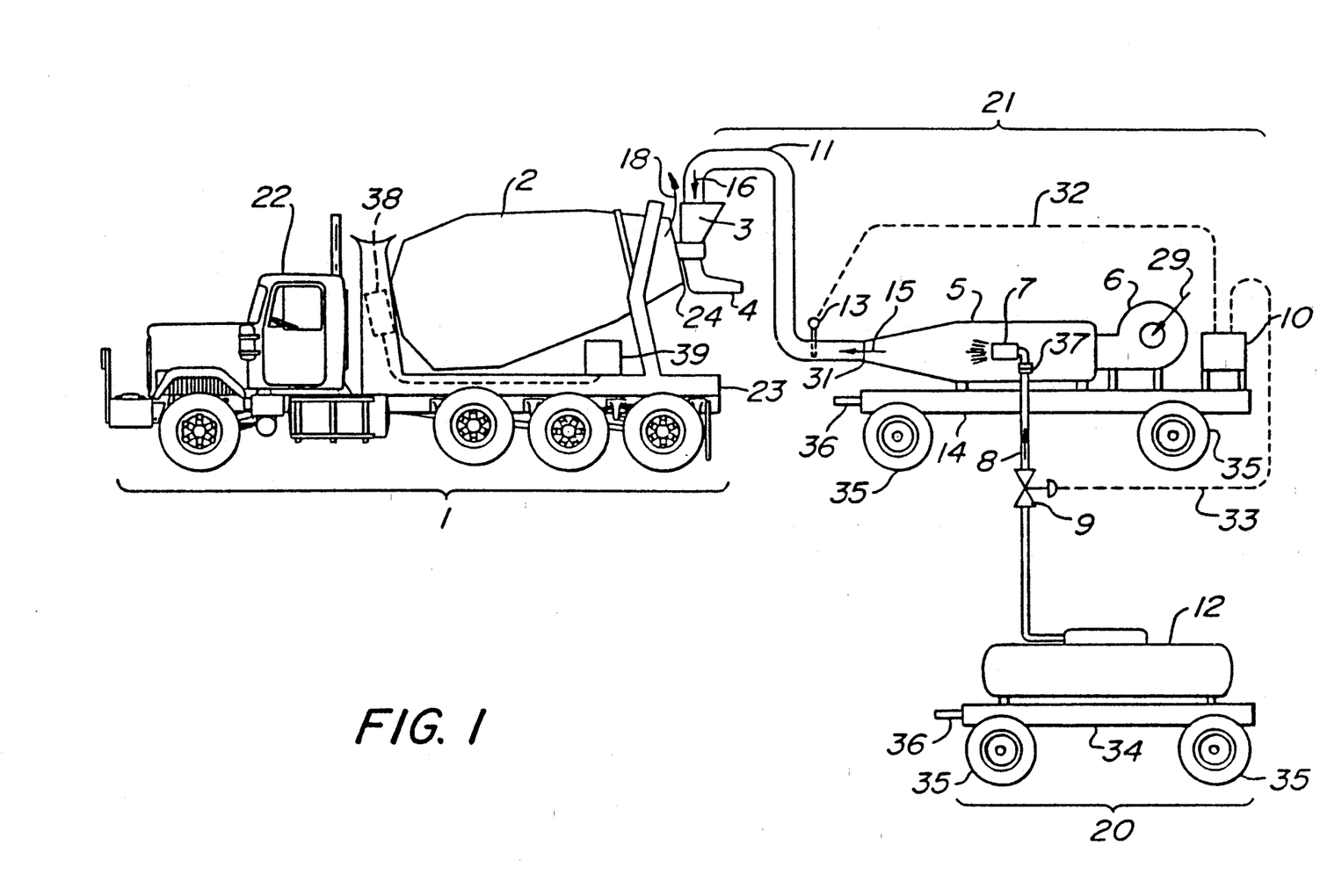
FIG. 1 is a schematic representation of one embodiment of the thermal stripper system according to the current invention.

There is shown in FIG. 1 a schematic diagram of one embodiment of a portable thermal stripping system according to the current invention. The primary components of the system are a cement truck 1, an air heater 21, and a fuel supply 20. The cement truck is comprised of a tractor 22, connected to a truck bed 23 on which is supported a drum 2. The drum is capable of rotation about its longitudinal axis in both the clockwise and counter clockwise directions at varying speeds through the action of a hydraulic drive mechanism 38 which is disposed in the truck bed and powered by the truck engine. In the preferred embodiment, the drive mechanism 38 is capable of rotating the drum at speeds up to 50 RPM. The drum rotational speed may be controlled by varying the engine RPM by adjustment of the throttle setting. At any given throttle setting, the drum rotational speed may also be adjusted by operating a valve in the hydraulic drive system. The initiation and direction of drum rotation is controlled through panel 39, which features start, stop and forward/reverse rotation switches. The drive system described above is of the standard type used in cement trucks.

The drum is an approximately cylindrically shaped vessel. In the preferred embodiment, the drum is of the standard cement truck type, such as Model Rex 770, which may be purchased from Rex Works, Inc., Milwaukee, Wis., 53201. Preferably, the drum has an axial length of approximately 15 ft., a maximum diameter of approximately 8 ft., and a useful capacity in the range of 8-10 cubic yards of soil, such dimensions making the drum suitable for ready transportation using conventional cement truck tractors. However, the principles disclosed herein are equally applicable to larger or smaller drums. The drum features an opening 24 in its aft end, to which is attached an inlet hopper 3 and a discharge chute 4. As explained further below, soil to be processed enters and exits the drum through the inlet hopper and discharge chute, respectively.

As shown in FIG. 1, in the preferred embodiment, the axis of the drum is inclined with respect to the horizontal at an angle in the range of about 10-15 degrees. Note that the aft end, in which the opening 24 is disposed, is higher than the front end.

An auger mechanism is disposed within the drum. The auger mechanism performs two important functions—grinding/churning of the soil and transporting of the soil into and out of the drum. Since volatilization occurs through the surface of the soil particles, removal of contaminants from large clumps of soil would require prohibitively long processing times. The grinding action of the auger mechanism minimizes particle size, thereby increasing the surface area of the soil. Thus, pretreatment of the soil, even heavy clay-like soil, is not required. The churning action of the auger mechanism constantly exposes the surfaces of the particles to fresh quantities of hot air, supplied to the drum as explained below, thereby mechanically aerating the soil. Thus, the auger mechanism minimizes the time required for adequate volatilization.

Figure 3:
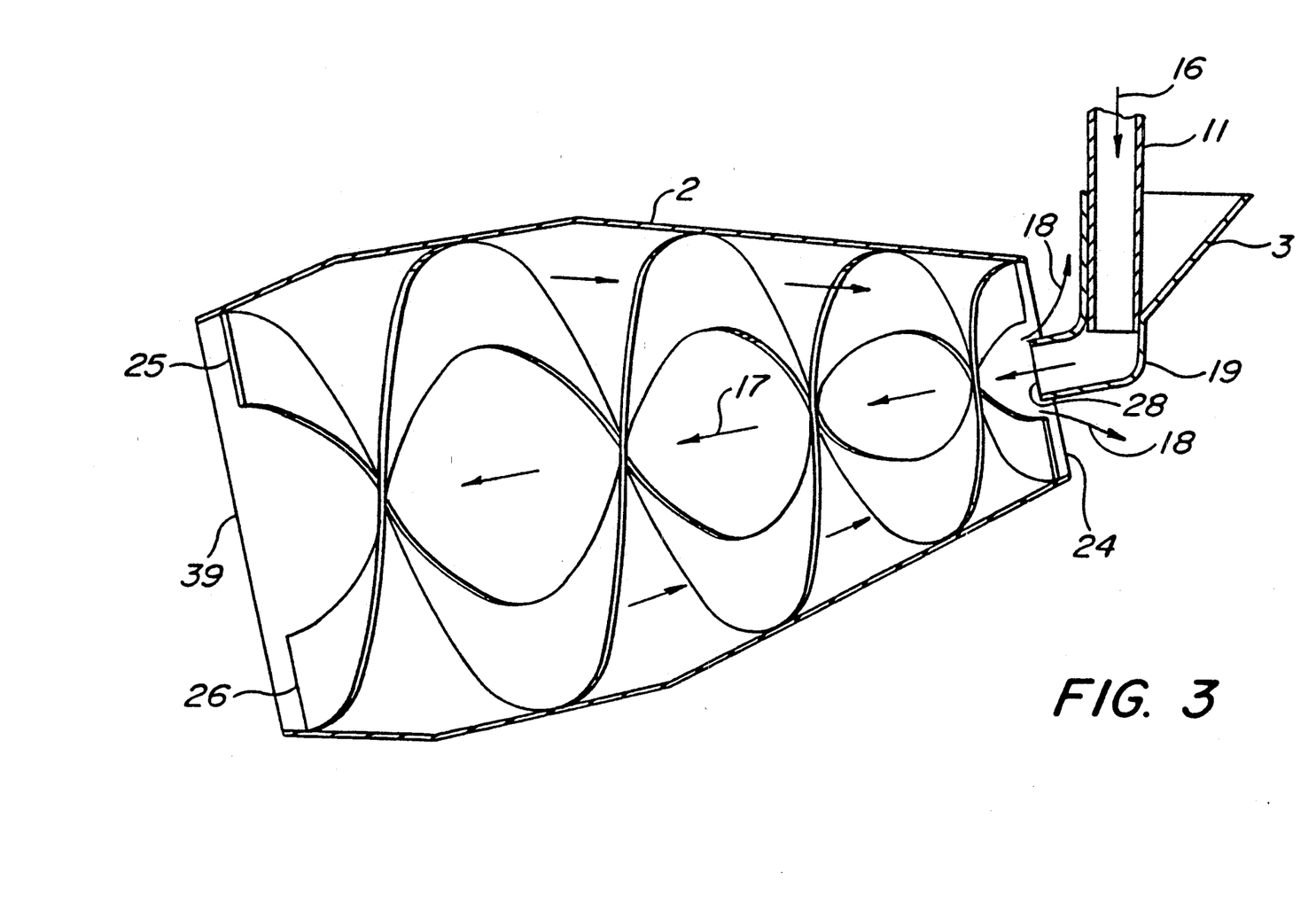
FIG. 3 is a cross section of the drum taken through line III—III shown in FIG. 2, illustrating the auger mechanism.

As shown in FIG. 3, in the preferred embodiment, the auger mechanism is comprised of two continuous helical baffles 25, 26 which extend the length of the drum and terminate at the opening 24. Each helix is affixed at its periphery to the inner surface of the drum, for example, by welding, and projects radially inward into the drum. The axis of each helix is coincident with the longitudinal axis of the drum. Both helixes are of similar configuration—that is, both are right hand or both are left hand helixes. As shown in FIG. 3, the helixes are axially offset from each other by one-half pitch. The radial height of each helical baffle varies as the drum diameter varies along the length of the drum. For a drum with a maximum diameter of approximately 8 feet, the maximum radial height of the helical baffles is approximately 12-18 inches in the preferred embodiment.

Although flat baffles are shown in FIG. 3, more complex shapes, such as baffles whose inboard edges are bent at 45° or 90° to the body of the baffle, may be used to increase the churning capacity of the auger mechanism. Moreover, although two baffles are used in the preferred embodiment, as will be obvious to those skilled in the art, the auger mechanism may be comprised of a single helical baffle or three or more helical baffles similarly affixed to the drum.

The grinding/churning actions of the auger mechanism are achieved by rotating the drum, which in turn results in rotation of the auger about its axis using the aforementioned hydraulic drive mechanism. This arrangement is standard for cement trucks. Alternatively, the auger mechanism could be comprised of one or more helical baffles affixed at their inner edge to a shaft, the center line of the shaft being coincident with the longitudinal axis of the drum. In this embodiment, the drum would remain stationary and the grinding/churning action of the auger mechanism would be achieved by rotating the shaft within the drum.

As previously discussed, the auger mechanism serves to transport, as well as grind and churn the soil. Thus, rotation of the drum in one direction serves to carry the soil up the incline from the bottom of the drum and pushes it out onto the discharge chute. In this respect, the auger mechanism functions as a screw-type conveyor. Rotation of the drum in the opposite direction results in the aforementioned grinding and churning action. The direction of rotation, clockwise or counter clockwise, which causes the transporting and grinding/churning actions, respectively, depends on whether the auger helix is right or left handed, and may be arbitrarily chosen. As will be apparent to those skilled in the field of screw-type conveyors, the minimum pitch sufficient to efficiently carry soil out of the drum is related to the incline angle of the drum—that is, the greater the incline, the smaller the helical pitch required.

Figure 4:
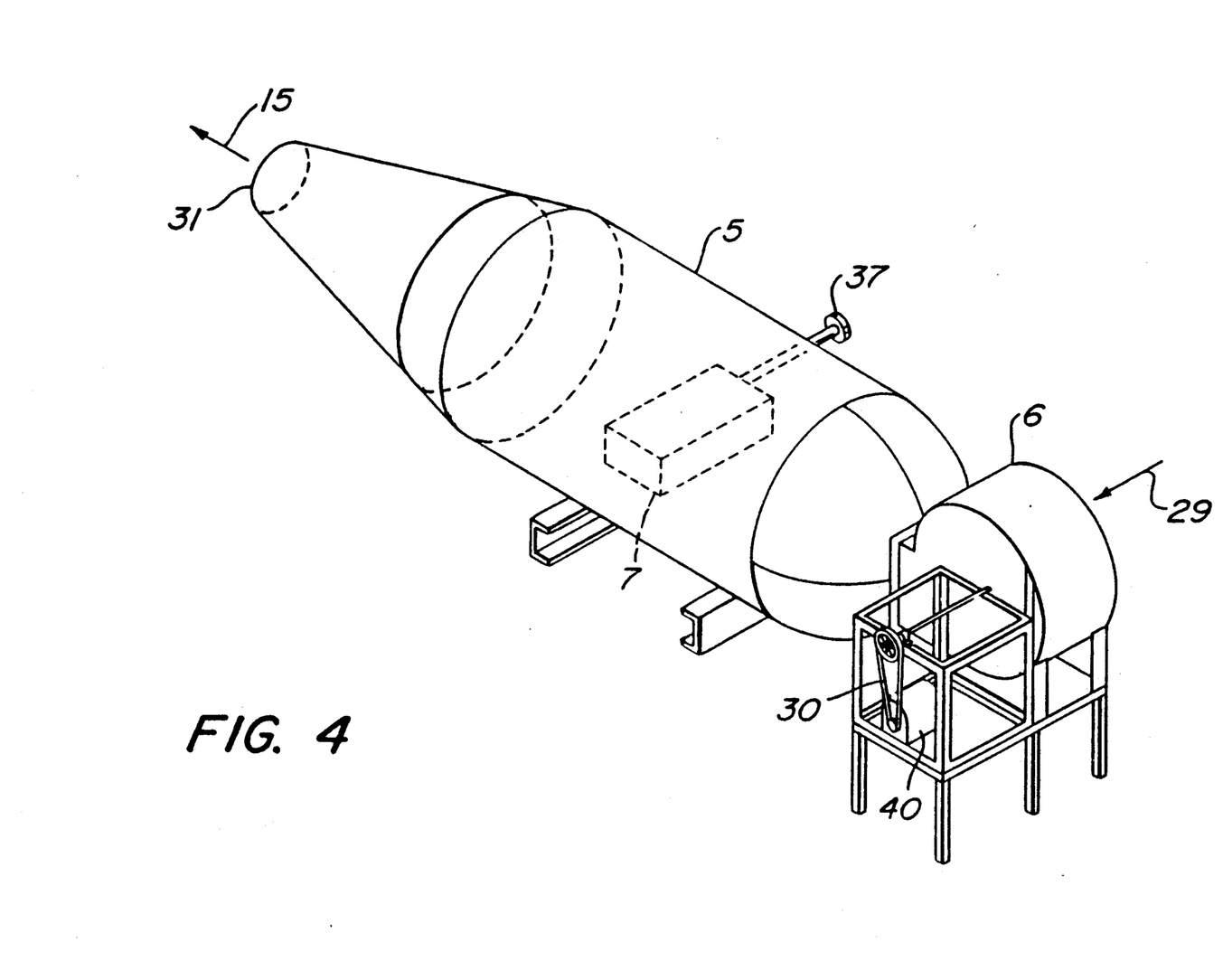
FIG. 4 is a perspective view of the air heater shown in FIG. 1.

Returning to FIG. 1, it can be seen that the air heater 21 is comprised of a cylindrical vessel 5, a fan 6, a duct 11, a skid 14, a burner 7 and a control module 10. The burner 7, which is of the in-stream type (meaning the air to be heated flows over the burner), is disposed within the vessel 5 as shown in FIG. 4, and burns a liquid or gaseous fuel. The burner is supplied with fuel from the fuel tank 12, which is mounted on skid 34. Piping 8 connects the fuel tank to the burner and features a detachable coupling 37 at the piping/burner interface. In the preferred embodiment, the burner operates on propane fuel and has a maximum heat release capacity of 2.5 mbtu/hr.

As shown in FIG. 4, a fan 6 is connected to the aft end of the vessel 5. Ambient air 29 is drawn into the vessel by the fan and forced to flow over the burner 7, providing it with the necessary combustion air. In the preferred embodiment, the fan is of the centrifugal type and features backward inclined blades and has a maximum capacity of 4000 SCFM. Other types of fans, including axial fans, could also be used, provided they can deliver the flow of air required for good volatilization, which in turn depends on the size selected for the drum. In the preferred embodiment, the fan features an indirect drive through belt 30 from motor 40. The output of the fan is set by varying the speed of the fan by loosening or tightening the belt 30. Alternatively, the output of the fan could be varied by the use of variable inlet guide vanes, variable inlet or outlet dampers, or a variable speed motor.

After being heated by the burner 7, the air 15 is discharged from the vessel 5 through a nozzle 31 at the front end of the vessel. Note that the walls of the vessel approaching the nozzle are gradually tapered to insure smooth flow and minimize the backpressure in the system. After exiting the nozzle, the hot air 15 flows through the duct 11, as shown in FIG. 1. A thermocouple 13 is disposed at the inlet to the duct and senses the temperature of the hot air. Since the vapor pressure of volatile organic compounds increases with increasing temperature, the hotter the air temperature, the more rapid the volatilization rate. However, the temperature should not be so high as to cause incineration of the soil. Therefore, in the preferred embodiment, the temperature of the hot air 15 discharging from the vessel is maintained in the 800°-1500° F. range, depending on the type of contaminant. Moreover, as a result of the intervening duct 11, the flames generated by the burner do not penetrate into the drum, further ensuring volatilization without incineration.

The temperature of the hot air is maintained in the desired range by the control module 10, which may be a micro-computer. The desired air temperature is manually entered into the control module. In addition, the output signal from the thermocouple 13 is transmitted to the control module through the conductor 32. Using means well to those skilled in the art of flow control systems, the control module compares the measured temperature to the desired temperature and transmits an output signal to flow control valve 9, through conductor 33, the amplitude of which is proportional to the deviation in the measured temperature from the desired temperature. Valve 9 is disposed in the piping 8 between the fuel tank 12 and the burner 7, and regulates the fuel flow to the burner in response to the amplitude of the signal it receives. Thus, the fuel flow to the burner 7, and hence the temperature of the discharging air 15, is increased or decreased by operation of the control module on the flow control valve, as required to maintain the correct temperature. In addition to the flow control valve, other piping, valves and control features are necessary to reliably start and operate the burner and to ensure compliance with local safety regulations. However, such requirements are well known to those skilled in the art of burner systems and are not described in detail herein. In addition to regulating fuel flow, the control module performs the sequencing functions necessary to start and operate the fan and burner.

As shown in FIG. 1, the duct 11 terminates at the inlet hopper 3 of the drum. As shown in FIG. 3, the outside diameter of the duct 11 is only slightly smaller than the inside diameter of the hopper throat 19. Thus, no connection is required to mate the duct to the drum other than inserting the duct into the hopper throat.

The hopper is aligned so that its discharge 28 is concentric with the drum opening 24, thereby directing the incoming hot air 16 into the drum along its axis. The hot air 17 circulates within the drum and, as a result of the churning action of the auger mechanism, comes into direct contact with the soil particles. Thus, the combined effect of the auger mechanism and the air heater results in vigorous mechanical aeration and heating of the soil. This aeration and heating promotes rapid volatilization of the volatile organic compounds As explained above, the hopper discharge 28 is centrally disposed in the drum opening. The annular portion 27 of the drum opening 24 which surrounds the hopper discharge, shown best in FIG. 2, serves as the exhaust port for the drum. In the embodiment shown in FIG. 1, after circulating through the drum, the hot air 18 is exhausted directly into the atmosphere through the annular portion 27. The exhaust air 18 carries with it the vapors released as a result of the volatilization. Since the volatilization rate of the volatile organic compounds decreases with increasing pressure, the flow area of the annular portion 27 should be sized to prevent excessive build up of pressure in the drum. In the preferred embodiment, the diameter of the hopper discharge 28 is only about one third that of the drum opening 24 to ensure ample exhaust flow area.

As a result of the hot air being introduced at the center of the drum opening and the exhaust port being the annular portion surrounding this center portion, the hot air flows in the circulating flow path shown in FIG. 3. Entering air flows along the core of the drum, reverses direction at the end wall 39 of the drum and then flows out of the drum along the annulus surrounding the drum core. Not only does this flow path provide ample opportunity for contact between the soil particles being churned by the auger mechanism, it also reduces the tendency for "dusting"—that is, there is less of a tendency for fine soil particles to be entrained in air 18 exhausting from the drum if a circulating, as opposed to a straight through, air flow path is utilized In addition, the helical baffles 25, 26 act as separators, further preventing fine soil particles from being carried out of the drum.

According to the embodiment of the invention shown in FIG. 1, no post-processing clean up of the air exhausting from the drum is employed. Thus, the reduction in dusting afforded by the drum design is an important factor in obtaining the simplicity of this embodiment of the thermal stripping system. It should be noted that the permissibility of directly discharging volatile organic compounds into the atmosphere may be prescribed by federal and local environmental regulations, depending on the type of contaminant in the soil. However, discharge of many volatile organic compounds, such as those associated with gasoline spills, is often permitted subject to certain limitations—usually a maximum rate, expressed as pounds per day of contaminant. Thus, by (i) confining the use of the thermal stripper system to volatile organic compounds which can be safely exhausted directly into the atmosphere in limited quantities, (ii) minimizing the tendency for soil particles to be entrained in the exhaust air, and (iii) limiting the amount of soil processed per day, the cost and complexity of an exhaust gas clean up system can be avoided. As discussed further below, according to a second embodiment of the current invention, an exhaust gas clean up system is provided when these limitations on the operation of the thermal stripping system are unacceptable.

An important feature of the thermal stripping system is its ready transportability to the clean up site. The aeration device in the form of a cement truck 1 is easily relocated. Wheels 35 and hitches 36 are attached to the air heater skid 14 and the fuel supply skid 34, making these components entirely portable also. Moreover, upon arrival at the clean up site, one need only to connect the fuel tank to the burner piping at coupling 37, and the insert the hot air duct 11 into the hopper 3, to place the system into operation.

Once at the clean up site, to carry out the method of the invention, the soil to be treated is loaded into the drum through the inlet hopper 3 using standard excavation equipment, such as a front loader. The drum is rotated during the loading process so that the auger mechanism draws the soil from the hopper into the drum. This drum rotation is maintained during the entire soil processing period. To ensure that adequate room exists for the circulation of the hot air, the drum is only partly filled with soil.

After the soil is loaded into the drum, the air heater 21 is moved into position adjacent the drum and the duct 11 is connected to the hopper. The fuel skid 34 is also moved into position and the piping 8 is connected to the burner 7. The fan 6 is then started, followed by the burner 7. As previously mentioned, the control module 10 sequences the start up of the fan and burner and regulates the fuel flow control valve 9 so as to maintain the hot air 15 discharging from the air heater at the appropriate temperature. The air temperature is preselected based on a pre-treatment soil analysis, as discussed below. The hot air then circulates through the rotating drum as previously discussed. As a result of the drum rotation, the auger mechanism grinds and churns the soil, resulting in vigorous aeration of the soil with the hot air. This heating and aeration volatilizes the volatile organic compounds present in the soil. The volatilized organic compounds are then preferably expelled into the atmosphere.

During soil processing, the drum rotational speed must be maintained at the appropriate level for efficient grinding/churning action. A rotational speed which is too slow will result in most of the soil lying stagnate in the lower portion of the drum. A rotational speed which is too high will result in a centrifuge action, causing the soil to cling to the periphery of the drum. The appropriate speed for maximum grinding/churning efficiency will depend on the geometry of the auger mechanism, the diameter of the drum and the density and cohesiveness of the soil. In the preferred embodiment, the rotational speed of the drum is maintained within a range of about 4-18 RPM.

The processing described above is continued until the concentration of the volatile organic compounds in the soil is reduced to an acceptable level. As those skilled in the art will recognize, the acceptable level depends on the type of organic contaminant, and may also vary with local environmental regulations, but is generally in the range of 10 PPM by weight for the volatile organic compounds associated with gasoline spills The length of the processing time required to reduce the concentration of volatile organic compounds to an acceptable level will depend on a variety of design, operating, and soil parameters, as will be readily apparent to those skilled in the art. As previously discussed, the design parameters include the drum size, the geometry of the auger mechanism and the drum incline angle. The operating parameters include the drum rotational speed, the percent of the drum volume filled with soil, the air flow rate, the temperature of the air entering the drum and the air pressure within the drum. Soil parameters include the particle size distribution, cohesiveness, density, moisture content and temperature of the soil, as well as the contaminant type (specifically, the vapor pressure of the volatile organic compound) and its concentration level.

For components of a given design, the operating parameters and the required processing time period are initially determined based on a preliminary soil analysis. The required processing time is directly proportional to the soil particle size, cohesiveness, density, moisture content and contaminant concentration level and indirectly proportional to the soil temperature and the vapor pressure of the volatile organic compound. Since the soil is treated in a batch-like fashion, there is no limitation on the processing time. Moreover, the processing time can be set independent of the drum rotational speed. As those skilled in the art will recognize, clay-like soils will require longer processing time, whereas sandy soil will require shorter processing time. In general, it has been found that a processing time between about 30-90 minutes is adequate for the clean up of most soils contaminated with petroleum products. In one experiment conducted by the inventors, 1900 cubic yards of clay-like soil containing petroleum product contaminants were processed over a 21 day period. Initial concentrations of petroleum hydrocarbons as high as 7000 PPM by weight were reduced in this experiment to less than about 10 PPM by weight by processing for about 60 minutes at a drum rotation of 4 RPM and an airflow of 4000 CFM at 1000° F.

Although the preliminary soil analysis provides initial operating parameters and processing time estimates, samples of processed soil should also be periodically analyzed to insure that the operating parameters and processing time are adequate for the particular conditions of the clean up site. In the preferred embodiment, the soil is analyzed after each 50 cubic yards of soil has been processed.

After the required processing time has elapsed, the burner and fan are shut down and the duct is disconnected from the drum. The drum is then transported to the soil storage area and its rotation is reversed, so that the auger mechanism conveys the processed soil out of the drum and into discharge chute 4. The drum is then reloaded with fresh soil and the process repeated in a batch-like fashion until all of the contaminated soil has been cleaned.

Figure 5:
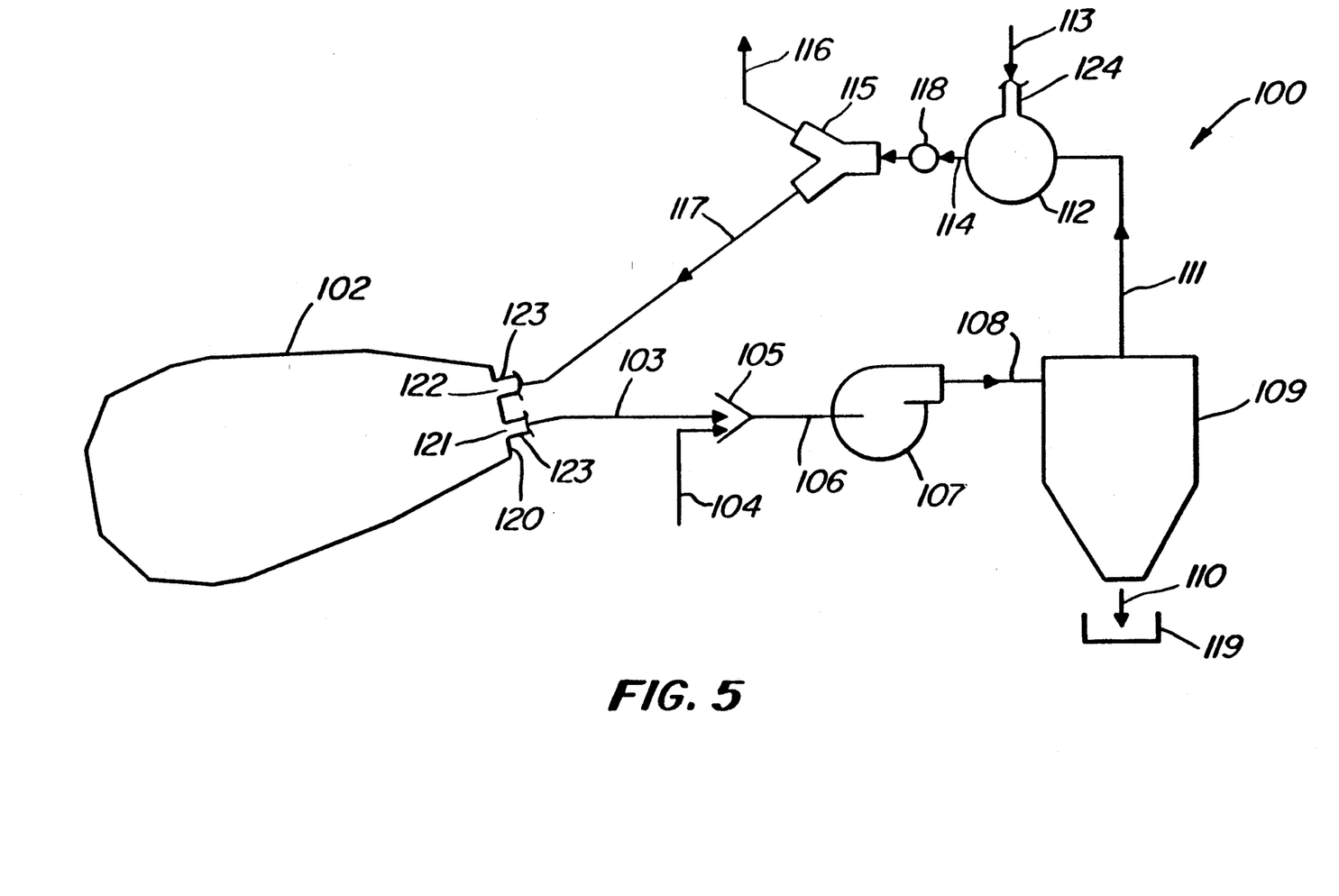
FIG. 5 is a schematic diagram of an alternative embodiment of the thermal stripping system according to the current invention.

FIG. 5 shows a schematic diagram of an alternate embodiment 100 of the thermal stripping system according to the current invention. This embodiment features an exhaust gas clean up and recirculation system to increase the thermal efficiency of the thermal stripper and to minimize the amount of pollutant discharged to atmosphere.

Figure 2:
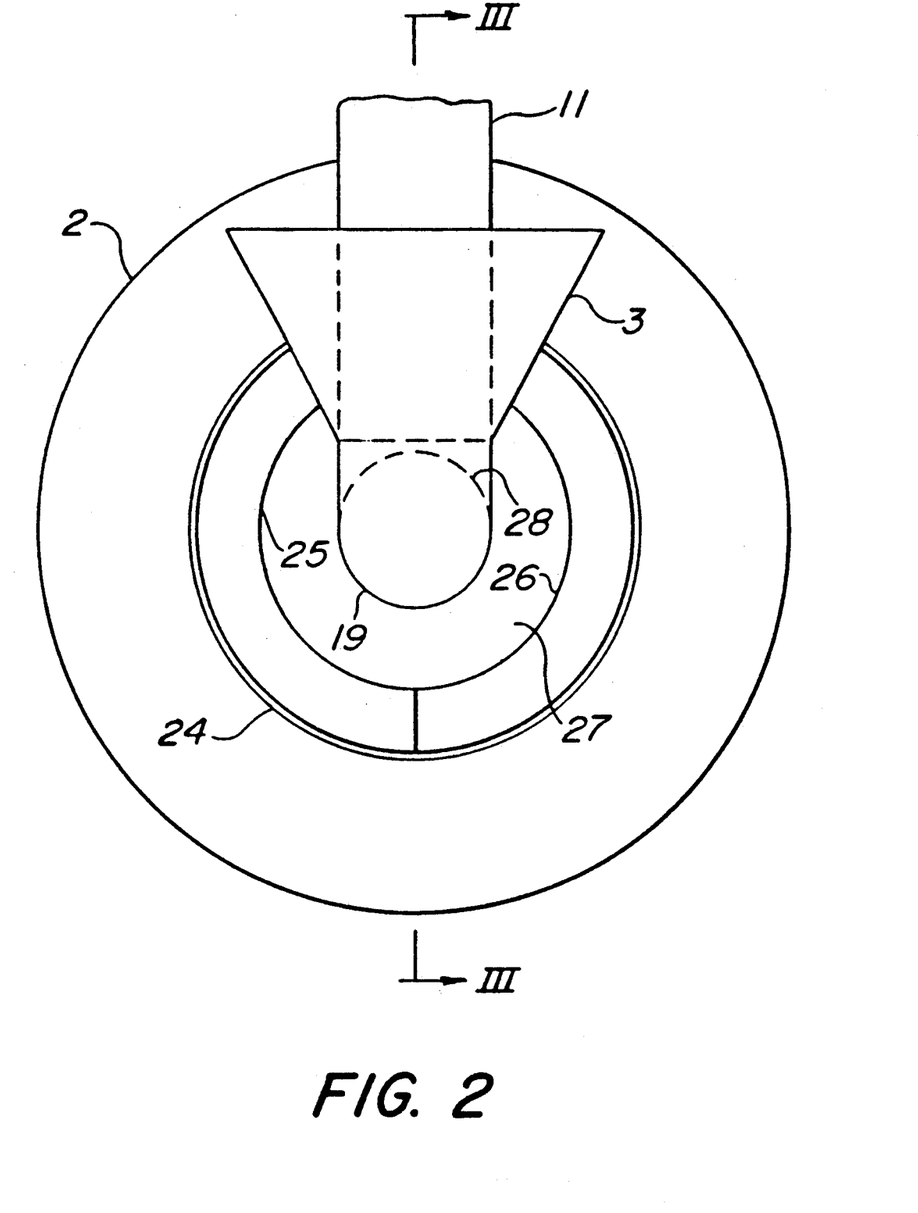
FIG. 2 shows the rear end of the drum shown in FIG. 1, without the discharge chute installed.

The thermal stripper system 100 includes a cylindrical vessel 102 into which a predetermined quantity of contaminated soil is loaded. The vessel 102 may be the rotating drum of a conventional cement truck, as previously discussed. However, other devices, such as rotary dryers, capable of bringing a gas into intimate contact with the soil may also be utilized. The other major components of the system are an aspirator 105, a blower 107, a cyclone separator 109, a storage bin 119, a burner 112, and a flow splitter 115. All of these components are placed into flow communication with each other, and with the vessel 102 by ductwork 123. Although for simplicity, only the portions of the ductwork immediately adjacent the vessel 102 are shown in FIG. 2, it should be understood that the ductwork 123 connects each of the components shown by directing the flow of hot gas from component to component as indicated by the arrows 103, 106, 108, 111, 114 and 117 designating the hot gas flow path.

As explained further below, a hot recirculating stripping gas 117, heated into approximately the 800°-1500° F. temperature range, is directed to the vessel 102 by duct 123 and introduced therein by an inlet port 122 formed in a cover 120 sealing the opening in the end of the vessel. As previously discussed, in the vessel 102, the hot gas 117 comes into intimate contact with the contaminated soil causing the VOC contained therein to be volatilized into the gas. Fine particles of soil are also entrained in the gas. The gas 103, now cooled to approximately 500° F., is discharged from the vessel 102 via exhaust port 121 formed in cover 120.

Air is then introduced into the discharged gas 103 by directing the gas, via duct 123, to the aspirator 105. In the preferred embodiment, the aspirator 105 is a funnel-like device having a perimeter which is open to the atmosphere. The gas 103 is directed to the center of the aspirator 105 while ambient air 104 is drawn into the perimeter of the aspirator by the blower 107. Air 103 is introduced into the gas 103 to ensure that sufficient oxygen exists for combustion of the gas, as explained further below. Although an aspirator is used in the preferred embodiment, those skilled in the art will appreciate that other means of introducing ambient air into the gas may be utilized, such as an additional blower to inject the air into the gas.

The oxygenated and further cooled gas 106 is then directed by the duct 123 to the blower 107, which may be of the centrifugal type. The blower 107 pressurizes the gas and directs it, via the duct 123, to a cyclone separator 109. As is conventional, in the cyclone separator 109, the gas is carried downward in a vortex created by the internal surface of the cyclone separator. Solid particles—in this case, fine soil particles entrained in the gas when it circulated through the vessel 102 and ash from combustion of VOC volatilized in the burner 112—are centrifuged toward the outer edges of the vortex and travel downward to a solids discharge port where the particles 110 exit the separator and are collected in a storage bin 119. The cleaned gas 111 then flows upward through the cyclone separator 109 end exists through a gas discharge port, whereupon it is directed by duct 123 to a burner 112

The burner 112, which may be of in-stream type previously discussed, is supplied with supplemental fuel 113 from a fuel supply (not shown) via conduit 124. In the preferred embodiment, the fuel is propane supplied from a tank which is included in the transportable apparatus, as previously discussed. The flow of fuel 113 to the burner 112 is regulated, using techniques well known in the art, by the control module, as previously discussed. The burner control system receives a signal from a temperature sensor 118 disposed in duct 123 downstream of the burner and regulates the flow of fuel 113 so as to maintain the desired temperature of the gas 114 exiting the burner. In the preferred embodiment, the gas 114 is heated such that its average temperature is in the approximately 800°–1500° F.—range, most preferably approximately 1400° F., thereby ensuring good volatilization in the vessel 102 when the gas is recirculated thereto, as explained below.

In the burner 112, the flame temperature is sufficient to cause oxidation of a substantial portion of the VOC previously volatilized into the gas, thereby transforming the VOC into less harmful substances, such as carbon dioxide and water. A portion 116 of the gas 114 from the burner 112 is exhausted to atmosphere through a flow splitter 115. In the preferred embodiment, the gas 116 exhausted to atmosphere represents approximately one half of the flow of gas 114 from the burner 112. As a result, the amount of air 4 introduced into the gas 103 by the aspirator 105 is approximately equal to the flow of gas 103 discharging from the vessel 102. Thus, the flow of gas into the drum remains constant and sufficient oxygen is added to ensure that the gas supplied to the burner 112 is combustible. It is important to note that the removal of particulate matter in the cyclone separator 109 and the removal of VOC in the burner 112 allows considerably more soil to be treated without exceeding local environmental limits for these substances.

The flows splitter 115 recirculates a second portion 117 of the gas 114 from the burner 112 to the vessel 102 via duct 123, whereupon it enters via inlet port 122 and the cycle is repeated.

As can be readily seen, since one half of the gas discharged from the vessel 102 is recirculated thereto by the duct 123, the sensible heat contained therein is not lost. Thus, the amount of fuel 113 which must be consumed by the burner 112 to achieve the proper temperature of the gas 117 entering the vessel is considerably reduced. It should also be appreciated that the combustion of the VOC in the gas 111 not only removes pollutants, it contributes to the heat release in the burner 112, thereby further reducing fuel consumption.

Thus, as a result of the exhaust gas cleanup and recirculation system previously described, both the maximum capacity and the energy efficiency of the thermal stripper system are considerably increased.

According to an important aspect of the current invention, the entire thermal stripping system, including all the components of the exhaust gas cleanup and recirculation system shown in FIG. 5, are readily transportable by mounting onto mobile skids, as previously discussed.

Although the thermal stripper system has been described by reference to specific components, as will be clear to those of skill in the art, other components are also suitable for use in the system—for example, the centrifugal blower 107 could be replaced by other types of fluid moving apparatus, such as an axial fan, the cyclone separator could be replaced by other particle removal devices, such as bag houses, and a burner other than a gas fired in-stream type could be utilized. Accordingly, the present invention may be embodied in other specific forms without departing from the spirit or essential attributes thereof and, accordingly, reference should be made to the appended claims, rather than to the foregoing specification, as indicating the scope of the invention.

What is claimed is:

1. A method for removing volatile organic compounds from soil in a batch process, comprising the steps of:
   a) loading a batch of said soil into a vessel;
   b) introducing a hot gas into said vessel and causing said hot gas to come into contact with said soil, thereby partially cooling said hot gas and volatilizing said volatile organic compounds into said gas, the rate at which said volatile organic compounds are volatilized into said gas generally decreasing an said batch of soil is processed;
   c) discharging said gas from said vessel;
   d) introducing air into said discharged gas; thereby forming an combustile gas;
   e) burning said combustible gas by introducing a supplemental fuel into said gas, thereby oxidizing at least a portion of said volatile organic compounds volatilized into said gas and reheating said gas into a predetermined temperature range, the quantity of said supplemental fuel introduced being controlled so as to maintain said gas in said predetermined temperature range despite said decrease in said rate at which said volatile organic compounds are volatilized into said gas as said batch of soil is processed;

f) recirculating at least a first position of said reheated gas to said vessel and causing said reheated gas to come into contact with said soil, thereby partially cooling said reheated gas and volatilizing said volatile organic compounds into said reheated gas; and g) repeating steps (c)-(f).

2. The method according to claim 1, wherein a second portion of said gas is discharged to atmosphere prior to the step of recirculating said gas.

3. The method according to claim 2, wherein the quantity of said second portion of said gas is approximately equal to the quantity of said air introduced.

4. The method according to claim 2, wherein the step of discharging a portion of said gas is performed after the step of burning said gas.

5. The method according to claim 2, wherein the step of causing said hot gas to come into contact with said soil results in entraining soil particles into said gas, and the step of burning said gas results in entraining ash into said gas, and further comprising the step of removing at least a portion of said soil particles and said ash prior to the step of discharging said second portion of said gas to atmosphere.

6. The method according to claim 5, wherein the step of removing said soil particles and ash comprises the step of centrifuging said gas.

7. The method according to claim 1, wherein said predetermined temperature range is within the range of approximately 800° F. to 1500° F.

8. An apparatus for removing volatile organic compounds from soil in a batch process by volatilizing said volatile organic compounds into a gas, the rate at which said volatile organic compounds are volatilized into said gas generally decreasing as said batch of soil is processed, comprising:

a) a vessel for holding a batch of said soil;

b) means, in flow communications with said vessel, for directing a hot gas to said vessel;

c) means, in flow communication with said vessel, for discharging said gas from said vessel;

d) means, in flow communication with said gas discharging means, for introducing air into said discharged gas;

e) means, in flow communication with said air introducing means and including means for introducing a supplemental fuel into said discharged gas, for combusting said volatile organic compounds volatilized into said gas and said supplemental fuel, whereby said gas is heated into a predetermined temperature range;

f) means for controlling the quantity of said supplemental fuel introduced into said combusting means so as to maintain said gas in said predetermined temperature range despite said decrease in said rate at which said volatile organic compounds are volatilized into said gas as said batch of soil is processed; and g) means, in flow communication with said vessel, for recirculating at least a portion of said combusted gas form said combusting means to said vessel.

9. The apparatus according to claim 8, further comprising means, disposed between said combusting means and said recirculating means, for discharging at least a portion of said combusted gas.

10. The apparatus according to claim 8, wherein said combusting means is a gas burner.

11. The apparatus according to claim 8, further comprising means, in flow communication with said vessel, for removing particles from said gas discharging from said vessel.

12. The apparatus according to claim 11, wherein said particle removing means is a cyclone separator.

13. The apparatus according to claim 8 further comprising means, in flow communication with said vessel, for pressurizing said gas discharging from said vessel.

14. The apparatus according to claim 8, wherein said means for introducing air into said discharged gas comprises an aspirator.

15. The apparatus according to claim 8, wherein said means for controlling the quantity of said supplemental fuel introduced into said combusting means comprises (i) a microcomputer, and (ii) a sensor for sensing the temperature of said gas downstream from said combusting means and for transmitting a signal representative of said temperature sensed to said microcomputer.

* * * * *

UNITED STATES PATENT AND TRADEMARK OFFICE
CERTIFICATE OF CORRECTION

PATENT NO. : 5,282,695
DATED : Feb. 1, 1994
INVENTOR(S) : Crosby et al.

It is certified that error appears in the above-identified patent and that said Letters Patent is hereby corrected as shown below:

Col. 5, ln. 25 -- change "means well" to "means well known"

Col. 9, ln. 35 -- change "burner 112" to "burner 112."

Col. 9, ln. 50 -- change "F--range," to "F range,"

Col. 10, ln. 55 -- change "decreasing an" to "decreasing as"

Col. 10, ln. 59 -- change "forming an" to "forming a"

Col. 12, ln. 20 -- change "form" to "from"

Signed and Sealed this

Ninth Day of August, 1994

Attest:

BRUCE LEHMAN

Attesting Officer

Commissioner of Patents and Trademarks